April 25, 1967    J. FERGUSON ETAL    3,316,050
OPTICAL MODULATOR EMPLOYING THE DICHROIC ABSORPTION
OF ANTIFERROMAGNETIC NIF₂
Filed Aug. 9, 1963    2 Sheets-Sheet 1

INVENTORS: J. FERGUSON
D. L. WOOD

ATTORNEY

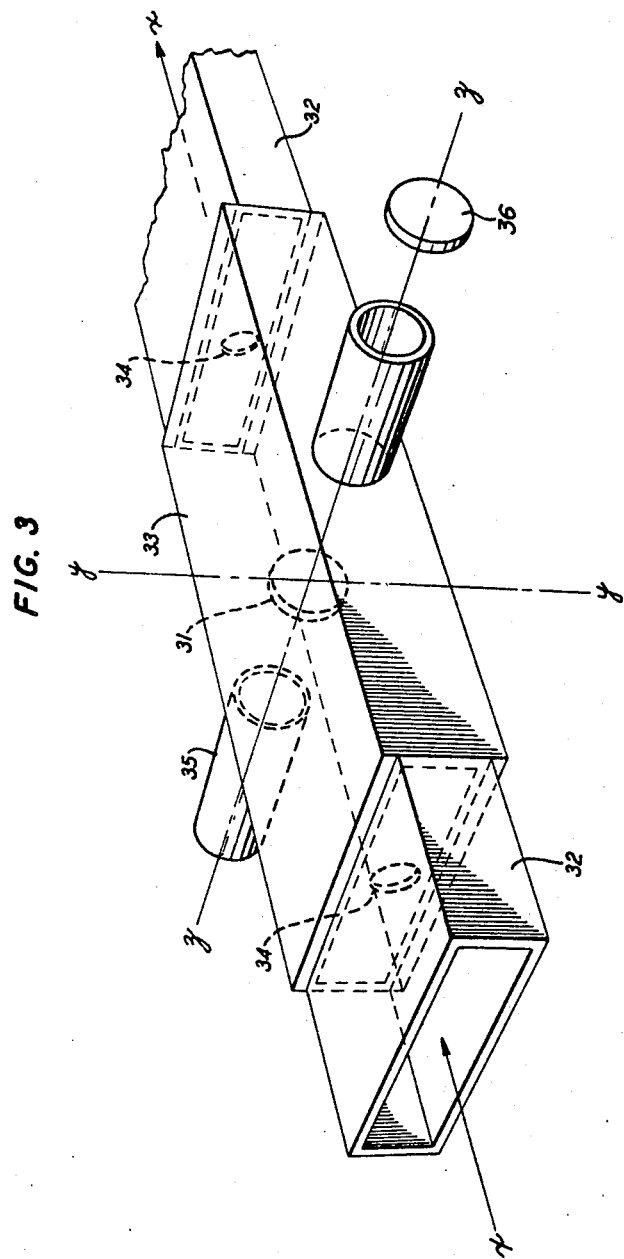

3,316,050
OPTICAL MODULATOR EMPLOYING THE DICHROIC ABSORPTION OF ANTIFERROMAGNETIC NiF₂
James Ferguson and Darwin L. Wood, Murray Hill, N.J., assignors to Bell Telephone Laboratories, Incorporated, New York, N.Y., a corporation of New York
Filed Aug. 9, 1963, Ser. No. 301,030
5 Claims. (Cl. 350—1)

This invention relates to optical modulators wherein effective amplitude modulation is achieved by a magnetically induced variation in the dichroic absorption of single-crystal nickel fluoride.

Nickel fluoride ($NiF_2$) is antiferromagnetic below 74° K. with a weak ferromagnetic polarization due to the canting of the nickel spins. It has been found that certain low temperature electric transitions in nickel fluoride reflect the magnetic polarization due to the spin system. In some cases there is a sizable fluorescence associated with the transition. Since in these cases the transition moment is related to the spin moment rather than the lattice structure, as in the usual case, the transitions themselves can be significantly affected by changing the polarization of the spin system. Thus it has been found that a small external magnetic field, applied to the crystal in the appropriate direction, can significantly alter the intensity of a given absorption band.

This invention is directed to an optical amplitude modulator based upon this mechanism.

The operation of the device will perhaps be more easily understood by considering the following detailed description. In the drawing:

FIG. 3 is a perspective view of an alternative arrangement for varying the magnetic field in the modulating crystal.

Figure 1:
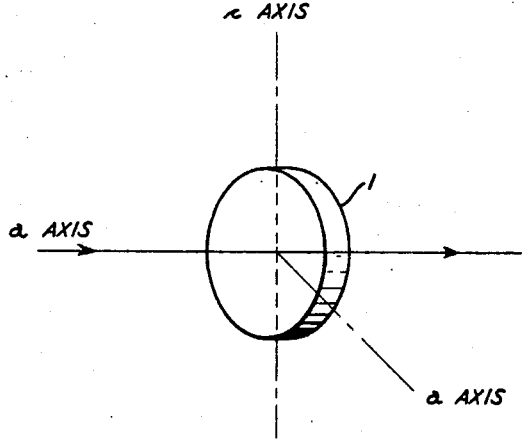
FIG. 1 is a perspective view of an optical modulator constructed according to the principles of this disclosure.

A typical modulating device configuration of the invention is shown in FIG. 1. The modulating medium 1 is a crystal of nickel fluoride which may be grown, for instance, by the technique described in the Journal of Physical Chemistry, vol. 64, page 938 (1960). Appropriate means (not shown) are provided for maintaining the crystal at a temperature below its Neél temperature of 73° K. The thickness of the crystal in the direction of transmission (indicated by the arrow) is not critical but is preferably thin to reduce the absorption losses on the signal. According to this consideration it is preferred that the crystal be 10 mm. or less in thickness since the optical density of the crystal prohibits significant transmission of any frequencies through greater thicknesses.

The crystal 1 is oriented so that the $c$-axis is in the direction indicated and one of the $a$-axes is also in the major plane of the crystal section. With no external field applied the spin moments are aligned in the major plane of the crystal. Now a magnetic field having a component perpendicular to the crystal wafer 1 will modulate the amplitude of the radiation passing at normal incidence through the section. The field H is indicated schematically in FIG. 1. Since the absorption spectrum is extremely nonuniform the amount of modulation is dependent on the wavelength of the radiation being modulated. Any of several absorption bands can be chosen. For instance, a strong absorption appears at 1.499 microns or 6670 cm.⁻¹, which is in the near infra-red.

At this wavelength the transmission of a plate 0.3 mm. thick will vary from about 25% transmission to 1% transmission on the application of 6000 gauss (H.). For an applied field of 1500 gauss the transmission will decrease from 25% to 10%. Since the material saturates at approximately 6000 gauss no practical reason is seen for exceeding that field value.

For the purposes of this invention a 10% modulation is considered a minimum useful value. At a transmission level of approximately 1% this occurs with 100 gauss when the crystal thickness is the previously prescribed 1.0 mm. Thus a range of 100 gauss to 6000 gauss is appropriate for the modulating field according to this invention.

The attenuation suffered in the foregoing examples is quite high. However, since modulation is generally more difficult and expensive to achieve than amplification, such losses in the modulating stage can be tolerated. The attenuation resulting from transmission losses can be reduced as a function of the thickness of the crystal wafer 1. Thin films, such as epitaxial films give quite low transmission losses. The reflection loss remains fixed and is comparable to prior art crystal and glass modulators.

Although the crystal body 1 has a peculiar orientation with respect to the applied magnetic modulating field it will be obvious that the modulating field can deviate from this direction and still influence the direction of spin polarization to an extent sufficient to achieve useful modulation. It is only essential that the modulating field have a vector component which is normal to the $c$-axis of the crystal and normal to the direction of spin polarization.

Crystals of nickel fluoride are unusual in their inherent property of spontaneous magnetization. A high quality crystal sample which is relatively free of strains and has the dimensions described here will retain a high degree of spin polarization. Thus the familiar polarizing field found in many magnetic devices is not essential to the operation of the device of this invention. However, crystal samples of lower quality which locally fracture on thermal cycling lose the spontaneous polarization. These crystals are still useful for modulators according to the invention if a polarizing field is applied. The polarizing field may be applied in any direction as long as it has a component normal to the $c$-axis. The modulating field again must have a component normal to the direction of field induced polarization.

Figure 2:
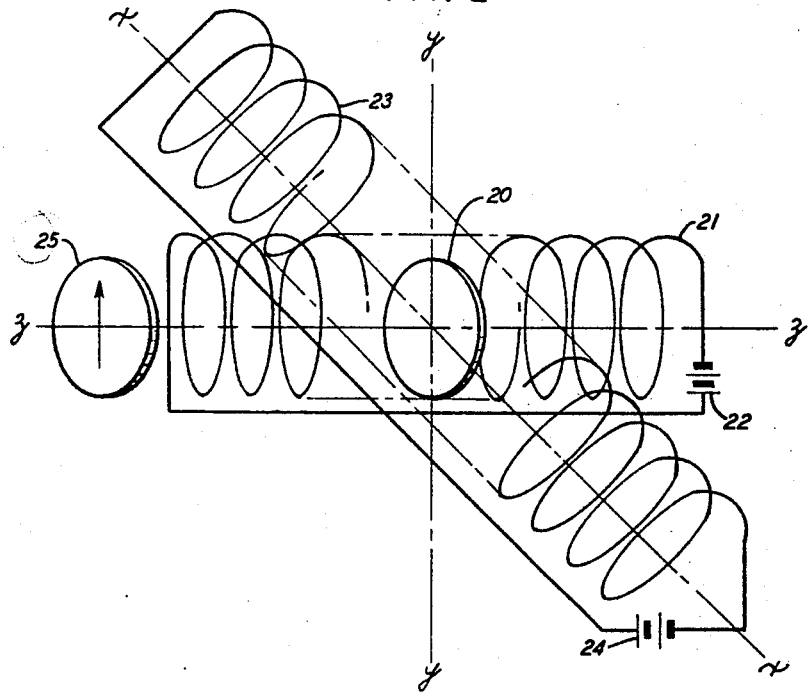
FIG. 2 is a perspective view similar to FIG. 1 with a schematic representation of an appropriate means for applying the desired magnetic field component to the modulating medium.

The optimum arrangement for maximum modulation for a given modulating field value is to have the direction of the light signal along one $a$-axis, the spins polarized in the direction of either $a$-axis and the modulating field along the $a$-axis normal to the spin direction. Such an arrangement is shown in FIG. 2. In this configuration the $NiF_2$ crystal 20 as its $c$-axis vertically oriented. The polarizing field is applied by coil 21, energized by D.C. source 22. The modulating field is applied by coil 23, energized by source 24 in a direction perpendicular to both the $c$-axis and the spin polarization direction. The light radiation being modulated propagates in the direction designated by the arrow. Since the absorption is dichroic in nature it is generally preferred to eliminate the unaffected radiation by a polarizer shown at 25. It makes no apparent difference whether the polarizer is placed before or after the modulator, except where dissipation of absorbed energy becomes a problem in creating heat, signal noise or other adverse effects. In such cases it is advantageous to position the polarizer as shown. It should be appreciated that the polarizer is not essential although, without it, the signal cannot be modulated below one-half of the amplitude of the input signal. If the polarizing field is sufficient to saturate the material without relying on any degree of spontaneous polarization the polarizing and modulating fields may be interchanged in FIG. 2. The effective components of the two fields are necessarily normal to one another along the two a-axes of the crystal.

An alternative procedure for applying the modulating field to the crystal is to couple the magnetic component of an RF signal into the crystal from a waveguide located adjacent to the crystal or in a cavity containing the crystal.

In FIG. 3 there is shown a device in which a microwave radio frequency field is used in such a manner. Along the axis designated as the z-axis, body 31, conveniently shown as a disc of nickel fluoride, is mounted with faces perpendicular to z, and c-axis in the x-direction. Along the x-axis are waveguides 32 leading into and out of resonant cavity 33 through apertures 34. Along the z-axis, chimneys 35 are mounted on both sides of cavity 33 connecting with the cavity through apertures as shown. The apertures and chimneys are of such dimensions that minimum leakage of microwave power from the cavity occurs. A polarizing direct-current magnetic field, supplied for example by electromagnetic coils (not shown), is impressed on body 31 so that the magnetization of body 31 is aligned parallel to the y-axis. Microwaves resonating in cavity 33 produce an oscillating radio frequency magnetic field lying in the crosswise bisecting plane of the cavity, here taken as the yz plane. Since body 31 is mounted in FIG. 3 to have its broad face perpendicular to this bisecting yz plane, the oscillating magnetic field can produce a component of the magnetization of body 31 perpendicular to its broad face (z direction). Ordinarily, the magnetic radio frequency fields will have little effect on orienting the magnetization of the crystal body 31. However, if the microwave frequency and the strength of the orienting field mentioned above are chosen to produce a resonance condition in the $NiF_2$ crystal wafer body, significant orientation of the magnetization of the body can be effected because of the effect of the radio frequency waves in inducing precession of the magnetization around an axis in the direction of the orienting field.

A beam of light injected through one of the chimneys 35 into the cavity and propagating through the crystal 31 will be transmitted at the resonance condition and heavily attenuated as the resonance dies away. For the reasons previously indicated it is preferable to include a polarizing prism 36 to remove the vertical component of the light since the dichroism with this arrangement affects the magnitude of the horizontal component.

Again, if the sample retains a high residual polarization a polarizing field is unnecessary.

Various other modifications and extensions of this invention will become apparent to those skilled in the art. All such variations and deviations which basically rely on the teachings through which this invention has advanced the art are properly considered within the spirit and scope of this invention.

What is claimed is:

1. An optical modulator comprising a single crystal of $NiF_2$ cut in a wafer shape having the c-axis and one a-axis in the plane of the wafer, means for maintaining the wafer at a temperature below 73° K., means for directing light radiation through said crystal wafer in the direction approximately corresponding with the other a-axis, means for impressing a modulating magnetic field on said crystal, said field having a vector component in a direction normal to the a-axis of spin polarization of the crystal.

2. The device of claim 1 wherein the modulating field varies from zero to approximately 6000 gauss.

3. The device of claim 1 further including a polarizing field having a magnetic component along one of the a-axes.

4. The device of claim 1 wherein the light radiation has a wavelength of approximately 1.5 microns.

5. The device of claim 1 further including a polarizing prism for removing the component of the light radiation which is polarized in the direction of the c-axis of the crystal.

References Cited by the Examiner

UNITED STATES PATENTS 2,974,568   3/1961   Dillon _____ 88—61

OTHER REFERENCES

Richards: "Far-Infrared Magnetic Resonance in $CoF_2$, $NiF_2$, K, $NiF_3$, and YbIG," Journal of Applied Physics, vol. 34, No. 4, April 1963, pp. 1237–1238.

JEWELL H. PEDERSEN, *Primary Examiner.*

E. S. BAUER, *Assistant Examiner.*